United States Patent
Keshava

(10) Patent No.: US 11,494,098 B2
(45) Date of Patent: Nov. 8, 2022

(54) VARIABLE PERFORMANCE STORAGE DEVICES

(71) Applicant: Western Digital Technologies, Inc., San Jose, CA (US)

(72) Inventor: Sunil Keshava, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 169 days.

(21) Appl. No.: 16/917,373

(22) Filed: Jun. 30, 2020

(65) Prior Publication Data

US 2021/0405899 A1  Dec. 30, 2021

(51) Int. Cl.
  *G06F 3/06* (2006.01)
(52) U.S. Cl.
  CPC ............ *G06F 3/0634* (2013.01); *G06F 3/061* (2013.01); *G06F 3/0688* (2013.01)
(58) Field of Classification Search
  CPC ...... G06F 3/0634; G06F 3/061; G06F 3/0688; G06F 3/0659
  See application file for complete search history.

(56) References Cited

U.S. PATENT DOCUMENTS

| | | | |
|---|---|---|---|
| 9,501,245 B2 | 11/2016 | Hussain et al. | |
| 10,114,675 B2 | 10/2018 | Ding et al. | |
| 10,203,912 B2 | 2/2019 | Jun et al. | |
| 11,093,175 B1* | 8/2021 | Kotzur | G06F 3/061 |
| 2018/0341606 A1* | 11/2018 | Bolkhovitin | G06F 3/0656 |
| 2019/0138209 A1 | 5/2019 | Benisty et al. | |
| 2019/0179660 A1 | 6/2019 | Qiu et al. | |
| 2019/0303002 A1* | 10/2019 | Frolikov | G06F 3/0605 |
| 2019/0303003 A1 | 10/2019 | Freyensee et al. | |
| 2020/0004445 A1 | 1/2020 | Benisty | |
| 2020/0019433 A1* | 1/2020 | Qiu | G06F 9/4831 |
| 2020/0073553 A1 | 3/2020 | Klein et al. | |
| 2020/0104056 A1 | 4/2020 | Benisty et al. | |
| 2020/0151134 A1 | 5/2020 | Helmick et al. | |
| 2020/0310657 A1* | 10/2020 | Cayton | G06F 3/067 |
| 2021/0208787 A1* | 7/2021 | Patel | G06F 3/0611 |

OTHER PUBLICATIONS

International Search Report and Written Opinion, PCT Application No. PCT/US2021/019232, dated Jun. 7, 2021.

\* cited by examiner

*Primary Examiner* — Edward J Dudek, Jr.
(74) *Attorney, Agent, or Firm* — Ravi Mohan; Rutan & Tucker, LLP

(57) ABSTRACT

Performance configurable controllers can include a variable performance storage device that has one or more communication channels for connection with a host-computing device and a plurality of memory devices within a memory array. The storage device may include controllers that provide access to separate memory devices within the memory array. The storage device can also have performance logic installed that can be configured to direct the controllers to operate at performance modes, each associated with a different level of performance. Each performance mode can be selectable by a host-computing device and can comprise one or more preconfigured control variables. In other embodiments, storage device performance can be configured to operate at various performance levels via direct control variable change requests sent from the host-computing system.

20 Claims, 9 Drawing Sheets

FIG. 5

| CONTROLLER | PERFORMANCE CONTROL VARIABLES | | | | |
|---|---|---|---|---|---|
| | SUBMISSION QUEUE PRIORITY | NUMBER OF QUEUES | NUMBER OF ENTRIES PER SUBMISSION QUEUE & COMPLETION QUEUE | COMMAND ARBITRATION | BANDWIDTH LIMITER |
| 1 | HIGHEST PRIORITY | HIGHEST POSSIBLE | HIGHEST POSSIBLE | HIGHEST | LOWEST |
| 2 | HIGHEST PRIORITY | HIGHEST POSSIBLE | HIGHEST POSSIBLE | HIGHEST | LOWEST |
| 3 | MEDIUM PRIORITY | MODERATE | MODERATE | MODERATE | MODERATE |
| 4 | LOWEST PRIORITY | MINIMUM REQUIRED | MINIMUM REQUIRED | MINIMUM | HIGHEST |

VARIABLE PERFORMANCE STORAGE DEVICES

This disclosure relates to storage device controllers. More particularly, the present disclosure technically relates to configuring performance levels between multiple storage device controllers.

BACKGROUND

Storage devices are ubiquitous within computing systems. Recently, solid-state memory devices capable of nonvolatile storage have become the predominant choice within various consumer electronics products. These storage devices can communicate and utilize various protocols including non-volatile memory express ("NVMe"), and peripheral component interconnect express ("PCIe") to reduce processing overhead and increase efficiency.

As processing capabilities have grown, the use of virtual machines has also increased. Virtual machines are an emulation of a computer system that is itself processed and executed as part of another computer system to provide functionality similar to that of a traditional physical computing device. It is becoming more common for various companies to utilize their available computing resources to provide virtual machines to customers as a service. As these virtual machine services have grown, so have methods of making these emulations operate more efficiently within their host-computing environments.

Often, different virtual machine customers may require different levels of computing resources. For example, a single person renting a cloud-based virtual machine would likely require far fewer computing resources than a large corporation that utilizes virtual machines to operate cash registers or process sale receipts throughout the company. However, if these two users (the single person and corporation) were to be using virtual machines utilizing the same storage device within the same host-computing system, there would not be an effective method to adjust access and performance to these varying users.

Because of this shortcoming, virtual machine providers are not able to prioritize storage device use between users. No method of offering differing levels of service or performance exists for users of the same storage device. This obviously creates inefficiencies within the host-computing device as the available storage device bandwidth is not optimized based on the needs of the virtual machine clients.

These problems are exacerbated by other changes within the client needs or various environmental factors of the host-computing environment. For example, a client that may have an upcoming, or time-dependent need for increased storage usage would not be able to optimize the drives currently utilized, even if other bandwidth in the drive were potentially available. This would require additional physical drives added to their virtual machine (often requiring the physical copying of files between the drives). Furthermore, when external factors like temperature may affect the host-computing device, the storage device cannot be throttled or otherwise balanced to reduce the potential for thermal leakage within the host-computing device from the storage device.

BRIEF DESCRIPTION OF DRAWINGS

The foregoing summary is illustrative and is not intended to be in any way limiting. In addition to the illustrative aspects, embodiments, and features described above, further aspects, embodiments, and features will become apparent by reference to the following drawings and the detailed description.

FIG. 5 is an exemplary chart depicting an example distribution of performance levels between various configurable performance controllers in accordance with embodiments of the invention;

Figure 1:
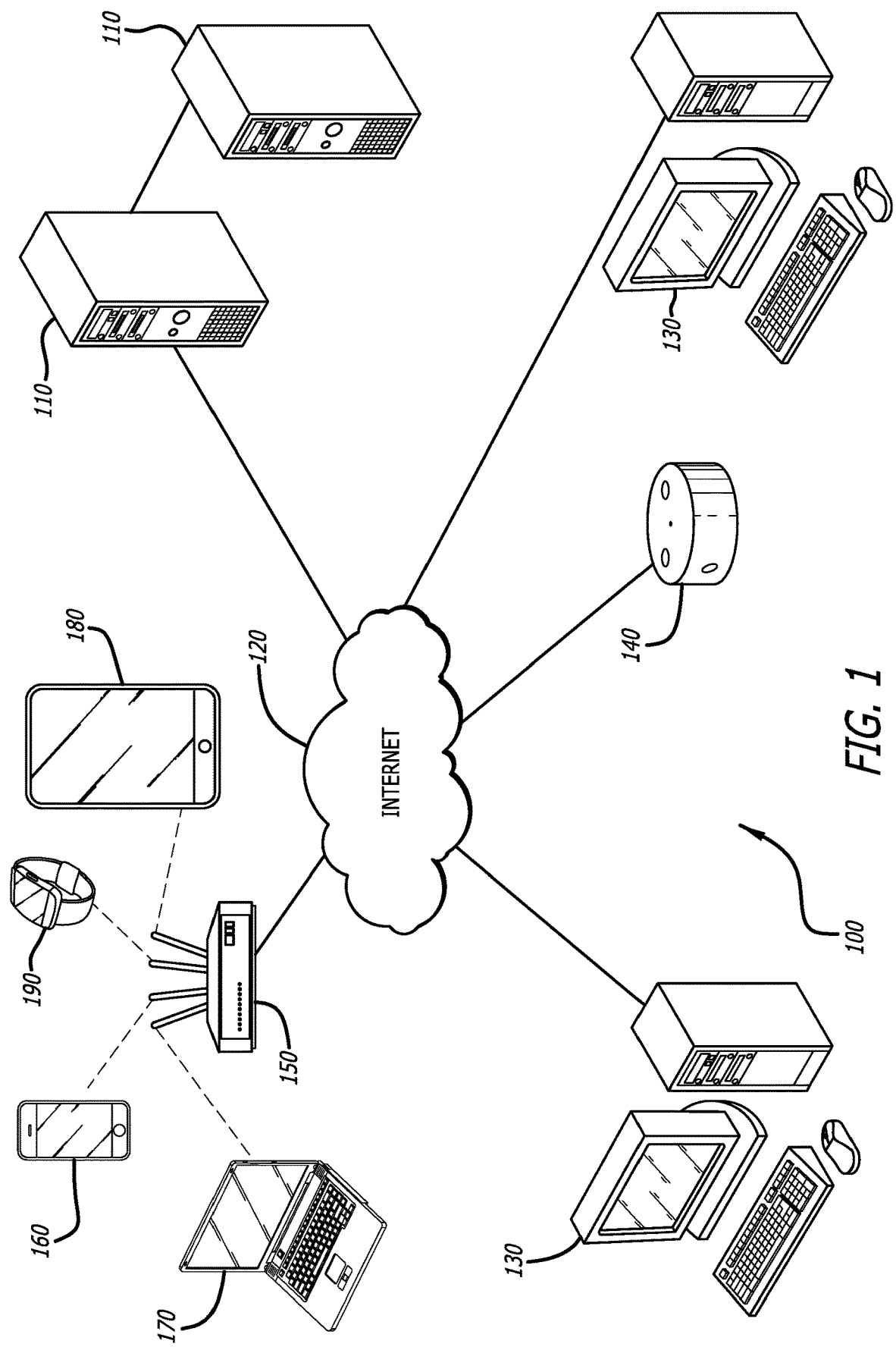
FIG. 1 is a conceptual system diagram of various devices comprising and in communication with variable performance storage devices with configurable performance controllers in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, systems and methods are discussed herein that describe processes for generating variable performance storage devices through the use of configurable performance controllers. As described in more detail below, many embodiments of the present application include a plurality of controllers within a storage device. Instead of each controller providing a static and uniform set of resources to the plurality of virtual machines connected to them, the host-computing device of the virtual machines may request either a generalized performance level from a plurality of performance levels or may specifically request increases or decreases in performance levels via adjustment of one or more performance control variables. The ability to provide varying levels of performance to each virtual machine can allow a cloud-based computing provider to offer various levels of performance for sale and may also increase overall efficiency within the data systems as fewer resources may go to waste.

Additional advantages include the ability to scale and provide better service to virtual machine clients. For example, a plurality of virtual machines may be configured to provide content to users over the Internet. However, increased storage device resources may be desired during specialized time periods like a new content release day. Instead of being forced to rely on additional physical or virtual drives, an increased available performance level and bandwidth from the variable performance storage device may negate the need for more drives during a high-demand period.

Finally, physical storage devices give off thermal heat during use. There may be times when reduction of thermal output within a host-computing system is more desirable than data throughput. In these instances, a reduction in performance may be utilized to reduce overall thermal output by the storage devices. Temporal periods may also be preconfigured to adjust performance to better align with reduced electricity costs at night or adjust performance levels when in response to increased demand on other virtual drives associated with the same variable performance storage device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like.

Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual system diagram of various devices comprising and in communication with variable performance storage devices with configurable performance controllers in accordance with an embodiment of the invention is shown. The system 100 comprises a plurality of devices that are configured to transmit and receive data that may be stored, retrieved, and otherwise utilized within variable storage devices. In many embodiments, cloud-based servers 110 are connected to a network 120 such as, for example, the Internet. Cloud-based servers 110 can be configured to transmit a variety of data across the network 120 to any number of computing devices such as, but not limited to, personal computers 130, personal listening devices 140, mobile computing devices including laptop computers 170, cellular phones 160, portable tablet computers 180 and wearable computing devices 190. Often, the cloud-based servers will provide access to one or more virtual machines or other virtualized devices with access to data stored within variable performance storage devices. In additional embodiments, this data may be accessed in additional cloud-based service provider servers or edge network systems that utilize variable performance storage devices. In still additional embodiments, the cloud-based servers 110 can be hosted as virtual servers within another cloud-based service.

In further embodiments, the requests and demands for access to virtual machines that can be provided by a cloud-based server 110 can occur over the network 120 through wired and/or wireless connections. In the embodiment depicted in FIG. 1, the mobile computing devices 160, 170, 180, 190 are connected wirelessly to the network 120 via a wireless network access point 150. It should be understood by those skilled in the art that the types of wired and/or wireless connections between devices on the system 100 can be comprised of any combination of devices and connections as needed. It is further conceived that various devices beyond the cloud-based servers 110 may utilize variable performance storage devices with configurable performance controllers and may provide virtualized devices and/or machines based on the application desired.

Figure 2:
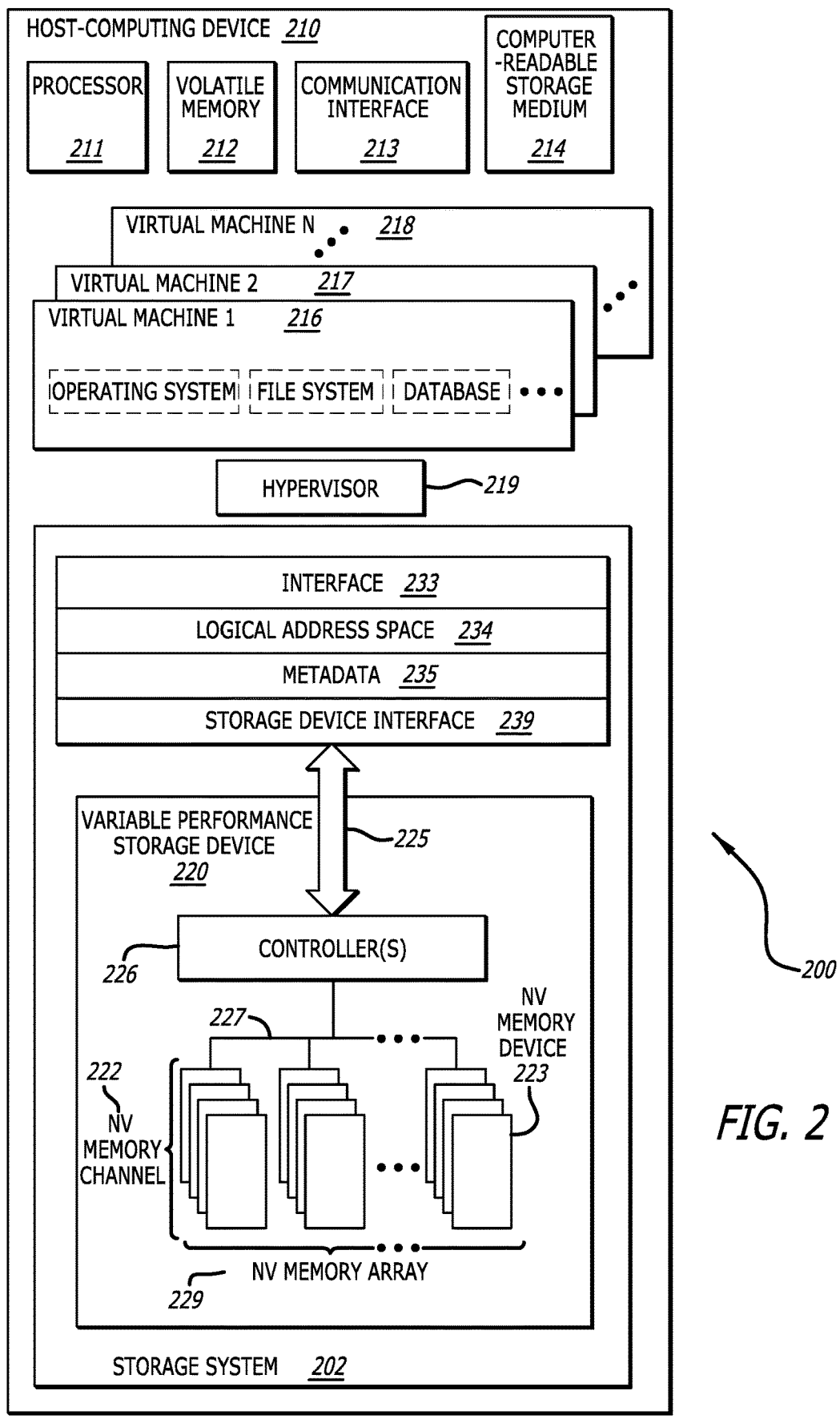
FIG. 2 is a schematic block diagram of a host-computing device with a variable performance storage device in accordance with an embodiment of the invention.

Referring to FIG. 2, a schematic block diagram of a host-computing device with a variable performance storage device in accordance with an embodiment of the invention is shown. The variable performance storage device system 200 comprises one or more variable performance storage devices 220 of a storage system 202 within a host-computing device 210 in communication via one or more controllers 226. The host-computing device 210 may include a processor 211, volatile memory 212, and a communication interface 213. The processor 211 may include one or more central processing units, one or more general-purpose processors, one or more application-specific processors, one or more virtual processors (e.g., the host-computing device 210 may itself be a virtual machine operating within a host), one or more processor cores, or the like. The communication interface 213 may include one or more network interfaces configured to communicatively couple the host-computing device 210 and/or controller(s) 226 of the variable performance storage device 220 to a communication network, such as an Internet Protocol (IP) network, a Storage Area Network (SAN), wireless network, wired network, or the like.

The variable performance storage device 220, in various embodiments, may be disposed in one or more different locations relative to the host-computing device 210. In one embodiment, the variable performance storage device 220 comprises one or more non-volatile memory devices 223, such as semiconductor chips or packages or other integrated circuit devices disposed on one or more printed circuit boards, storage housings, and/or other mechanical and/or electrical support structures. For example, the variable performance storage device 220 may comprise one or more direct inline memory module (DIMM) cards, one or more expansion cards and/or daughter cards, a solid-state-drive (SSD) or other hard drive device, and/or may have another memory and/or storage form factor. The variable performance storage device 220 may be integrated with and/or mounted on a motherboard of the host-computing device 210, installed in a port and/or slot of the host-computing device 210, installed on a different host-computing device 210 and/or a dedicated storage appliance on the network, in communication with the host-computing device 210 over an external bus (e.g., an external hard drive), or the like.

The variable performance storage device 220, in one embodiment, may be disposed on a memory bus of a processor 211 (e.g., on the same memory bus as the volatile memory 212, on a different memory bus from the volatile memory 212, in place of the volatile memory 212, or the like). In a further embodiment, the variable performance storage device 220 may be disposed on a peripheral bus of the host-computing device 210, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the variable performance storage device 220 may be disposed on a data network, such as an Ethernet network, an Infiniband network, SCSI RDMA over a network, a storage area network (SAN), a local area network (LAN), a wide area network (WAN) such as the Internet, another wired and/or wireless network, or the like.

The host-computing device 210 may further comprise a computer-readable storage medium 214. The computer-readable storage medium 214 may comprise executable instructions configured to cause the host-computing device 210 (e.g., processor 211) to perform steps of one or more of the methods disclosed herein. Additionally, or in the alternative, the performance logic 334 (FIG. 3) may be embodied as one or more computer-readable instructions stored on the computer-readable storage medium 214.

The host-computing device can include a plurality of virtual machines 216, 217, 218 which may be instantiated or otherwise created based on user-request. As will be understood by those skilled in the art, a host-computing device may create a plurality of virtual machines that is limited only based on the available computing resources and/or demand. A hypervisor 219 can be available to create, run, and otherwise manage the plurality of virtual machines 216, 217, 218. Each virtual machine 216, 217, 218 may include a plurality of host clients that may utilize the storage system 202 to store and access data. That data may be accessed via a variety of methods.

A device driver and/or the controller(s) 226, in certain embodiments, may present a logical address space 234 to the virtual machines 216, 217, 218. As used herein, a logical address space 234 refers to a logical representation of memory resources. The logical address space 234 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the variable performance storage device 220 may maintain metadata 235, such as a logical to physical address mapping structure, to map logical addresses of the logical address space 234 to media storage locations on the variable performance storage device(s) 220. A device driver may be configured to provide storage services to one or more virtual machines 216, 217, 218 or their respective host clients. The virtual machines 216, 217, 218 may include local clients operating on the host-computing device 210 and/or remote host clients accessible via the network and/or communication interface 213. The local clients within virtual machines 216, 217, 218 may include, but are not limited to: operating systems, file systems, database applications, server applications, kernel-level processes, user-level processes, applications, and the like.

The device driver may be further communicatively coupled to one or more storage systems 202 which may include different types and configurations of variable performance storage devices 220 including, but not limited to: solid-state storage devices, semiconductor storage devices, SAN storage resources, or the like. The one or more variable performance storage devices 220 may comprise one or more respective controllers 226 and non-volatile memory channels 222. The device driver may provide access to the one or more variable performance storage devices 220 via any compatible protocols or interface 233 such as, but not limited to, SATA and PCIe, although PCIe is currently more suitable. The metadata 235 may be used to manage and/or track data operations performed through the protocols or interfaces 233. The logical address space 234 may comprise a plurality of logical addresses, each corresponding to respective media locations of the one or more variable performance storage devices 220. The device driver may maintain metadata 235 comprising any-to-any mappings between logical addresses and media locations.

A device driver may further comprise and/or be in communication with a storage device interface 239 configured to transfer data, commands, and/or queries to the one or more variable performance storage devices 220 over a bus 225, which may include, but is not limited to: a memory bus of a processor 211, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network, Infiniband, SCSI RDMA, or the like. The storage device interface 239 may communicate with the one or more variable performance storage devices 220 using input-output control (IO-CTL) command(s), IO-CTL command extension(s), remote direct memory access, or the like.

The communication interface 213 may comprise one or more network interfaces configured to communicatively couple the host-computing device 210 and/or the controller(s) 226 to a network and/or to one or more remote host clients. The controller(s) 226 are part of and/or in communication with one or more variable performance storage devices 220. Although FIG. 2 depicts a single variable performance storage device 220, the disclosure is not limited in this regard and could be adapted to incorporate any number of variable performance storage devices 220.

The variable performance storage device 220 may comprise one or more non-volatile memory devices 223 of non-volatile memory channels 222, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 223 of the non-volatile memory channels 222, in certain embodiments, comprise storage class memory (SCM) (e.g., write in place memory, or the like).

While the non-volatile memory channels 222 may be referred to herein as "memory media," in various embodiments, the non-volatile memory channels 222 may more generally comprise one or more non-volatile recording media capable of recording data, which may be referred to as a non-volatile memory medium, a non-volatile storage medium, or the like. Further, the variable performance storage device 220, in various embodiments, may comprise a non-volatile recording device, a non-volatile memory array, a plurality of interconnected storage devices in an array, or the like.

The non-volatile memory channels 222 may comprise one or more non-volatile memory devices 223, which may include, but are not limited to: chips, packages, planes, die, or the like. One or more controller(s) 226 may be configured to manage data operations on the non-volatile memory channels 222, and may comprise one or more processors, programmable processors (e.g., FPGAs), ASICs, microcontrollers, or the like. In some embodiments, the controller(s) 226 are configured to store data on and/or read data from the non-volatile memory channels 222, to transfer data to/from the variable performance storage device 220, and so on.

The controller(s) 226 may be communicatively coupled to the non-volatile memory channels 222 by way of a bus 227. The bus 227 may comprise an I/O bus for communicating data to/from the non-volatile memory devices 223. The bus 227 may further comprise a control bus for communicating addressing and other command and control information to the non-volatile memory devices 223. In some embodiments, the bus 227 may communicatively couple the non-volatile memory devices 223 to the controller 226 in parallel. This parallel access may allow the non-volatile memory devices 223 to be managed as a group, forming a non-volatile memory array 229. The non-volatile memory devices 223 may be partitioned into respective logical memory units (e.g., logical pages) and/or logical memory divisions (e.g., logical blocks). The logical memory units may be formed by logically combining physical memory units of each of the non-volatile memory devices 223.

The controller(s) 226 may organize or partition the non-volatile memory array 229 into various virtual drives. In many embodiments, a partitioned virtual drive may be presented to a host-computing device as a separate physical drive. In further embodiments, the variable performance storage device 220 may assign one controller 226 to each partition within the non-volatile memory array 229. In this way, the host-computing device 210 would behave as if multiple physical drives were communicatively coupled instead of the sole physical variable performance storage device 220 actually coupled. In this way, the host-computing device 210 may pair each of the "virtual drives" with a "virtual machine." In this way, the virtual machines 216, 217, 218 may communicate and operate with each of the virtual drives as if they each had their own storage device. As will be described in further detail below, the host-computing device may send requests to the variable performance storage device 220 that can alter the performance of each of these partitions. In a number of embodiments, the requests from the host-computing device 210 are made directly to the configurable performance controller within the variable performance storage device 220 associated with the virtual drive. These configurable performance controllers may be physically separate controllers within the variable performance storage device or may be virtualized controllers within a single controller 226.

The controller(s) 226 may comprise and/or be in communication with a device driver executing on the host-computing device 210. A device driver may provide storage services to the virtual machines 216, 217, 218 via one or more interfaces 233. A device driver may further comprise a storage device interface 239 that is configured to transfer data, commands, and/or queries to the controller 226 over a bus 225, as described above.

Figure 3:
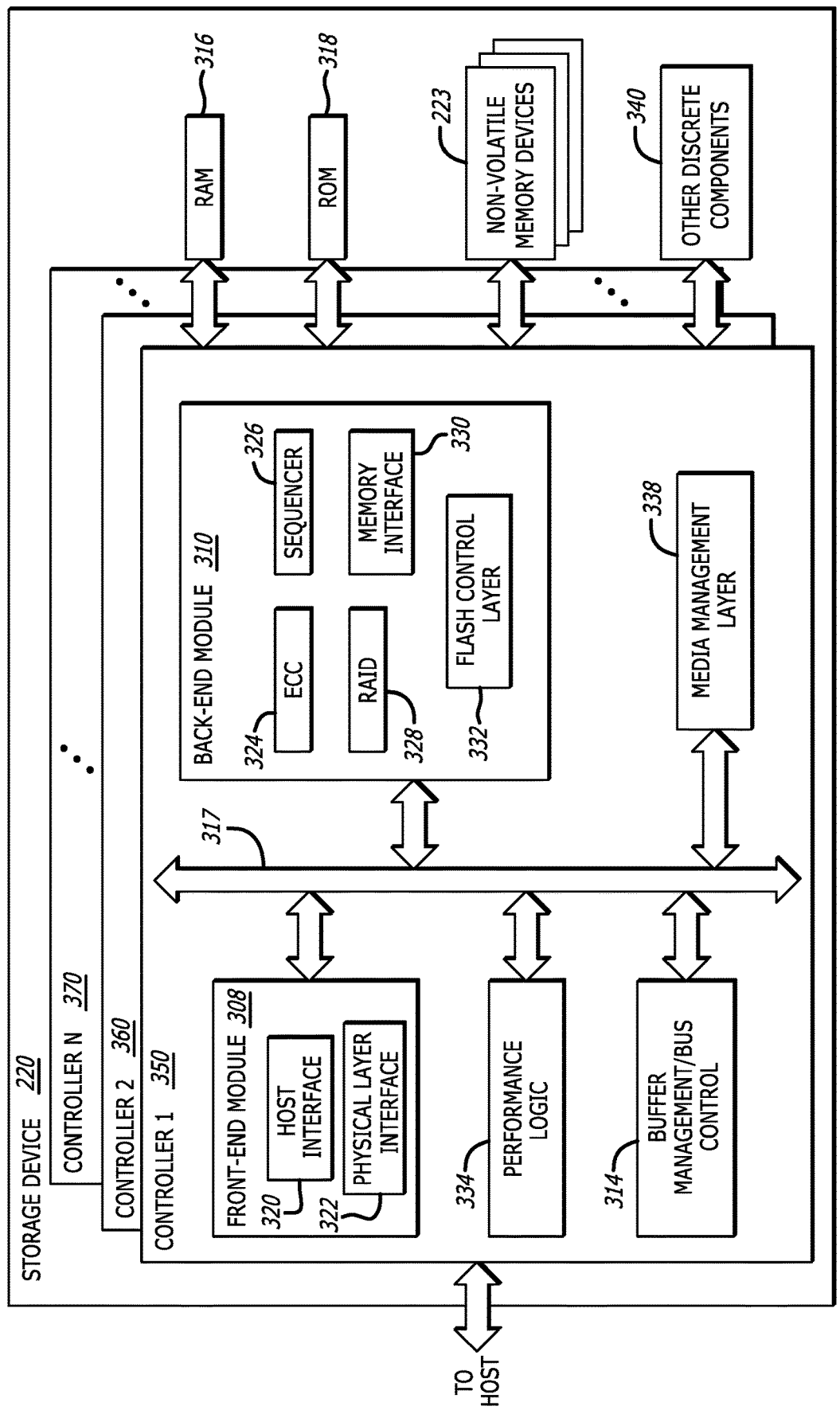
FIG. 3 is a schematic block diagram of a variable performance storage device in accordance with an embodiment of the invention.

Referring to FIG. 3, a schematic block diagram of a variable performance storage device 220 in accordance with an embodiment of the invention is shown. The variable performance storage device 220 can include any number of physical or virtual controllers 350, 360, 370. Each controller 350, 360, 370 may include a front-end module 308 that interfaces with a host (such as the host-computing system 210 of FIG. 2), a back-end module 310 that interfaces with the non-volatile memory devices 223, and various other modules that perform various functions of the variable performance storage device 220. In some embodiments, each logic or module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller(s) 350, 360, 370 may include a buffer management/bus control module 314 that manages buffers in random access memory (RAM) 316 and controls the internal bus arbitration for communication on an internal communications bus 317 of the controller 126. A read only memory (ROM) 318 may store and/or access system boot code. Although illustrated in FIG. 3 as located separately from the controller(s) 350, 360, 370, in other embodiments one or both of the RAM 316 and the ROM 318 may be located within each controller 350, 360, 370. In yet other embodiments, portions of RAM 316 and ROM 318 may be located both within the controller(s) 350, 360, 370 and outside the controller(s) 350, 360, 370. Further, in some implementations, the controller(s) 350, 360, 370, the RAM 316, and the ROM 318 may be located on separate semiconductor dies.

In various embodiments, one or more submission queues and one or more completion queues may be stored in a controller memory buffer, which may be housed in RAM 316. As will be understood by those skilled in the art, submission queues allow data to be stacked for transfer into storage devices for processing while completion queues stack the retrieved data associated with the processed request obtained from the submission queue. Typically, submission queues and completion queues within a storage device are static, may be divided equally, or at a fixed rate when partitioning a memory array for use by multiple controllers as virtual drives.

Additionally, the front-end module 308 may include a host interface 320 and a physical layer interface 322 that provides the electrical interface with the host or next level storage controller. The choice of the type of the host interface 320 can depend on the type of memory being used. Examples types of the host interfaces 320 may include, but are not limited to, SATA, SATA Express, SAS, Fibre Channel, USB, PCIe, and NVMe although the preferred method is currently NVMe. The host interface 320 may typically facilitate transfer for data, control signals, and timing signals.

The back-end module 310 may include an error correction controller (ECC) engine 324 that encodes the data bytes received from the host and decodes and error corrects the data bytes read from the non-volatile memory devices 223. The back-end module 310 may also include a command sequencer 326 that generates command sequences, such as program, read, and erase command sequences, to be transmitted to the non-volatile memory devices 223. Additionally, the back-end module 310 may include a RAID (Redundant Array of Independent Drives) module 328 that manages generation of RAID parity and recovery of failed data. The RAID parity may be used as an additional level of integrity protection for the data being written into the variable performance storage device 220. In some cases, the RAID module 328 may be a part of the ECC engine 324. A memory interface 330 can provide command sequences or requests to the non-volatile memory devices 223 and can receive status information from the non-volatile memory devices 223. Along with the command sequences and status information, data to be programmed into and read from the non-volatile memory devices 223 may be communicated through the memory interface 330. A flash control layer 332 may control the overall operation of back-end module 310.

Additional modules of the variable performance storage device 220 illustrated in FIG. 3 may include a media management layer 338, which performs wear leveling of memory cells of the non-volatile memory devices 223. The variable performance storage device 220 may also include other discrete components 340, such as external electrical interfaces, external RAM, resistors, capacitors, or other components that may interface with controller(s) 350, 360, 370. In alternative embodiments, one or more of the RAID modules 328, media management layer 338 and buffer management/bus controller 314 are optional components that may not be necessary in the controller(s) 350, 360, 370.

Finally, the controller(s) 350, 360, 370 may also comprise a performance logic module 334 that can be configured to receive, manage, and transmit signals and requests from a host-computing device in order to adjust performance control variables within one or more controllers 350, 360, 370. In various embodiments, the performance control variables are related to parameters of the submission and completion queues. In this way, the performance logic module 334 can increase or throttle the overall performance of one or more controller(s) 350, 360, 370 which will in turn affect the level of storage device performance received by the host-computing device, which often is associated with one or more virtual machines.

Figure 4:
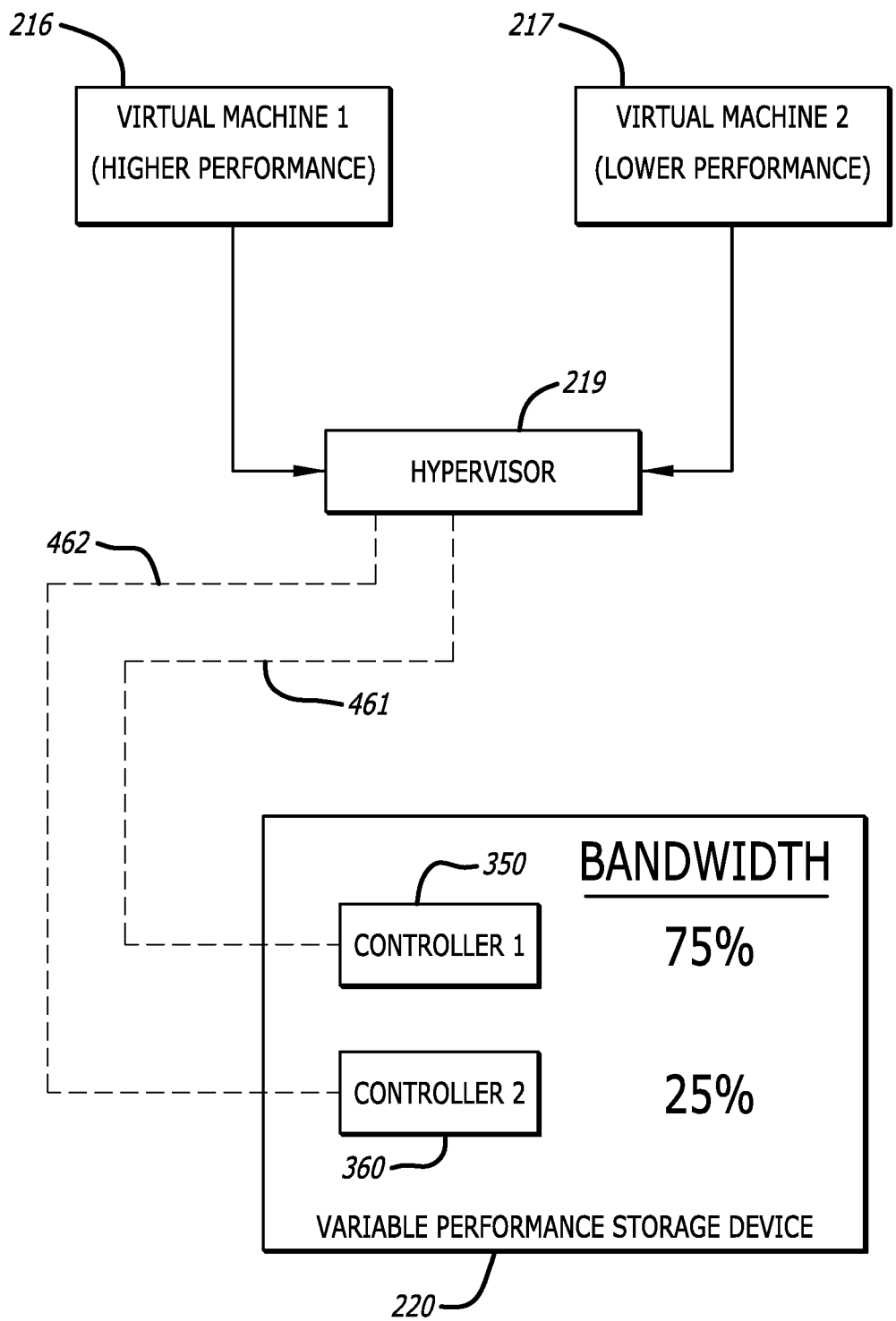
FIG. 4 is a high-level conceptual diagram depicting various performance control variable settings of differing performance levels in accordance with an embodiment of the invention.

Referring to FIG. 4, a high-level conceptual diagram depicting various performance control variable settings of differing performance levels in accordance with an embodiment of the invention is shown. To illustrate the process of utilizing configurable performance controllers 350, 360 within a variable performance storage device 220, FIG. 4 depicts an embodiment wherein a first virtual machine 216 and second virtual machine 217 are communicatively coupled to a hypervisor 219 which processes these channels of communication to connect to the variable performance storage device 220. Although depicted as a first communication line 461 and second communication line 462, various embodiments may utilize a single communication line or additional communication lines (such as an in-band and side-band channel) to communicate with the variable performance storage device 220. Additionally, certain embodiments may utilize protocols or performance features that allow the hypervisor to not facilitate communication between the virtual machines 216, 217 and the variable performance storage device 220. In other words, processing related to coupling the virtual machines 216, 217 to the variable performance storage device 220 can be avoided to reduce overhead within the hypervisor in these embodiments. An example of such an embodiment is depicted in more detail in FIG. 9.

As described above, a virtual machine 1 216 may have a need for increased (or higher) performance from the variable performance storage device 220 while virtual machine 2 217 may require less (or lower) performance. Increased performance may be requested in response to an immediate increased demand on computing resources, may be timed to coincide with an event, etc. Lower performance may be requested or demanded from timed events, or in response for a need to increase other controllers within the variable performance storage device 220. It is understandable to those skilled in the art that any storage device, including a variable performance storage device 220 will have a fixed level of throughput, resources, and performance. As such, this fixed limit cannot be exceeding by simply requesting more performance when the limit has already been reached. Therefore, when the fixed or native processing/performance limit has been reached, a request to increase performance must be coupled with or be responded to with a subsequent lowering of performance in another controller within the same variable performance storage device 220.

As an illustrative example and not limitation, virtual machine 1 216 in FIG. 4 is assigned to a tax preparation company that processes tax returns during tax season. Therefore, in the months of January to April, virtual machine 1 216 will have an increased demand for higher performance. Virtual machine 2 217 is utilized by a private company that processes payroll every two weeks. The private company does not utilize the entire available performance of their variable performance storage device 220 consistently. In this situation, the host-computing device hosting the virtual machines 216, 217 can request a higher level of performance for virtual machine 1 216 during the busy months. Upon receipt of the request, the variable performance storage device 220 can configure the performance of controller 1 350 to a "higher" performance mode utilizing 75 percent of the available performance. In order to not exceed the native limits of the variable performance storage device 220, controller 2 360 associated with virtual machine 2 217 is set to a lower performance level that utilizes 25 percent of the available performance. In this way, the available bandwidth and performance of the variable performance storage device 220 is better utilized by the host-computing device.

The above illustrative example is simplified to convey understanding of the concepts behind the disclosed embodiments of the invention. It would be understood by those skilled in the art that a variable performance storage device 220 may utilize a large number of controllers which may be adjusted to any available percentage of performance based on the received requests and available needs. Furthermore, the events and other motivations behind received requests may change and be adjusted on any usable scale including seconds, minutes, hours, days, etc. The overall division of performance within the variable performance storage device 220 may not always reach the native limit. In some embodiments, thermal inputs may indicate that each controller within the variable performance storage device 220 should be set to a lower performance level in order to reduce thermal leakage within the variable performance storage device 220.

Referring to FIG. 5, an exemplary chart depicting an example distribution of performance levels between various configurable performance controllers in accordance with embodiments of the invention is shown. Performance within a variable performance storage device 220 may be defined in various ways. In many embodiments, the performance within a variable performance storage device 220 can be defined as various performance control variables associated with one or more queues. Often, these can be the submission and completion queues associated with each controller within the variable performance storage device 220.

For example, each controller is assigned a particular submission queue priority level. In response to a request to increase performance, the submission queue priority associated with a controller may be increased. Conversely, a request or demand for lower performance within the variable performance storage device 220 may result in a lowering of the submission queue priority of the associated controller. In further embodiments, each controller within the variable performance storage device 220 can be assigned a specified (and uniform) number of submission queues and completion queues. Increased performance may then increase the number of these queues allocated to the controller, while decreased performance can decrease the number of queues. Of course, limits of these adjustments to performance control variables exist in that each variable performance storage device 220 can only assign a fixed number of queues available and can only assign a particular level of priority. Likewise, decreased performance can be limited to providing at least the minimum amount of resources necessary to operate.

Another performance control variable that can be adjusted is the number of entries available within each submission queue or completion queue. Increased performance can be associated with a higher amount of entries within each queue while decreased performance corresponds to a reduced amount of entries per queue. In various embodiments this can be achieved by changing fields within a controller capability register for the particular controller.

A further performance control variable that can be adjusted in relation to performance is the command arbitration. For example, some embodiments with a variable performance storage device 220 utilize a round robin system of arbitrating control commands. Each controller within the variable performance storage device 220 may compete for control and be assigned a weight. By adjusting the weight within the command arbitration process, performance can be adjusted between controllers. Therefore, increased performance can be associated with a greater weight while lowered performance can be associated with a lower weight.

Finally, another performance control variable can be a native bandwidth limiter within the variable performance storage device 220. In certain embodiments, controllers, and/or other processors within the variable performance storage device 220 can adjust the bandwidth associated with the submission queue of each controller. This can be accomplished at the hardware level. Therefore, higher performance can be associated with lower levels of bandwidth limiting while lower performance levels can be associated with higher levels of bandwidth limiting.

While a number of embodiments may allow for a host-computing device to request or manipulate each performance control variable individually (as discussed in more detail in FIGS. 7-8), certain embodiments described below may provide for a plurality of fixed performance modes. In this way, the host-computing device does not necessarily have to obtain or utilize granular commands to manipulate each performance control variable but can simply issue a command to increase or lower each desired performance level within the variable performance storage device 220. In further embodiments, the host-computing device can issue commands to set or conform each configurable performance controller within the variable performance storage device 220 to a plurality of preconfigured performance levels.

In order to execute these commands, a series of vendor unique commands can be implemented that provide the ability to select parameters which choose performance levels of a controller, increase or decrease performance levels of a controller, or adjust particular performance control variables within a controller. Additionally, a specialized command can be implemented that provides the host-computing device with the controller's current performance level. In many embodiments, these commands can be defined NVMe and/or NVMe MI vendor unique commands that can include, for example, changes to the maximum queue entries supported ("MQES") value. The firmware within the variable performance storage device 220 can also be configured to accept and process these vendor unique commands.

Likewise, specialized tools can be developed/deployed for the host-computing device in order to provide access to the commands. It is contemplated that further vendor unique commands can be associated with input environmental variables such as temperature which can, for example, reduce performance until an environmental threshold has been reached associated with thermal regulation. These commands may also be integrated into host tools to send traditional vendor unique commands in response to a preconfigured time or temperature threshold (e.g., lower performance to reduce thermal leakage/output, increase performance at night during lower energy cost time periods, increase performance during a new content release window, etc.).

By way of example and not limitation, a set of performance levels may be "high", "moderate" or "normal", and "low" performance. Each performance level within the plurality of preconfigured performance levels can be associated with a particular set of performance control variable settings. In certain embodiments, the settings are static values that can either be achieved or not under the current state of the variable performance storage device 220. In additional embodiments, the performance levels are set as relative values between each other based on the current configuration of the variable performance storage device 220. By issuing a request to set a particular controller to a particular performance level, the controller (or other component that sets performance control variables) may automatically adjust one or more performance control variables to facilitate the requested performance change.

By way of illustrative example, the chart in FIG. 5 depicts a variable performance storage device 220 comprising four separate controllers associated with unique memory devices within the memory array. Controller 1 510 and controller 2 have been assigned a "high" performance level. Controller 3 530 has been assigned a "moderate" level of performance. (In some embodiments, controller 3 530 may have started operations within this "normal" state and has yet to be assigned either a "higher" or "lower" priority level.) Controller 4 540 has been assigned a "lower" performance level.

As can be seen, the results of these assignments have changed the various performance control variables associated with each controller 510-540. For the submission queue priority 550, controllers 1 and 2 510, 520 have been given highest priority while controller 3 530 has a medium priority, and controller 4 540 has the lowest priority. The number of queues 560 available to controllers 1 and 2 510, 520 are also set to the highest possible value while controller 4 540 is set to the minimum required value. Controller 3 530 is configured with a value that resides between the minimum required and the highest possible. The number of entries per submission queue and completion queue 570 are likewise set to provide the highest possible available to controllers 1 and 2 510, 520, the minimum required to controller 4 540 and a moderate value between the minimum and highest value to controller 3 530. Additionally, weighting within command arbitration 580 can be set to the highest available weight for controllers 1 and 2 510, 520, the minimum weight for controller 4 540 and a moderate or normal weight for controller 3 530. Finally, an internal bandwidth limiter 590 can be set to the lowest possible settings for controllers 1 and 2 510, 520, the highest possible setting for controller 4 540 and a moderate or relatively moderate setting for controller 530.

It should be understood that the example above is illustrative only and that various embodiments within the invention may only adjust one or less than all of the performance control variables. This can occur in response to only certain performance control variable changes being available, or pre-configurations that only adjust particular performance control variables. As discussed above, each configuration of performance levels can be established during manufacture of the variable performance storage device 220 and can also be adjusted during a subsequent operation such as, but not limited to, a firmware update.

Figure 6:
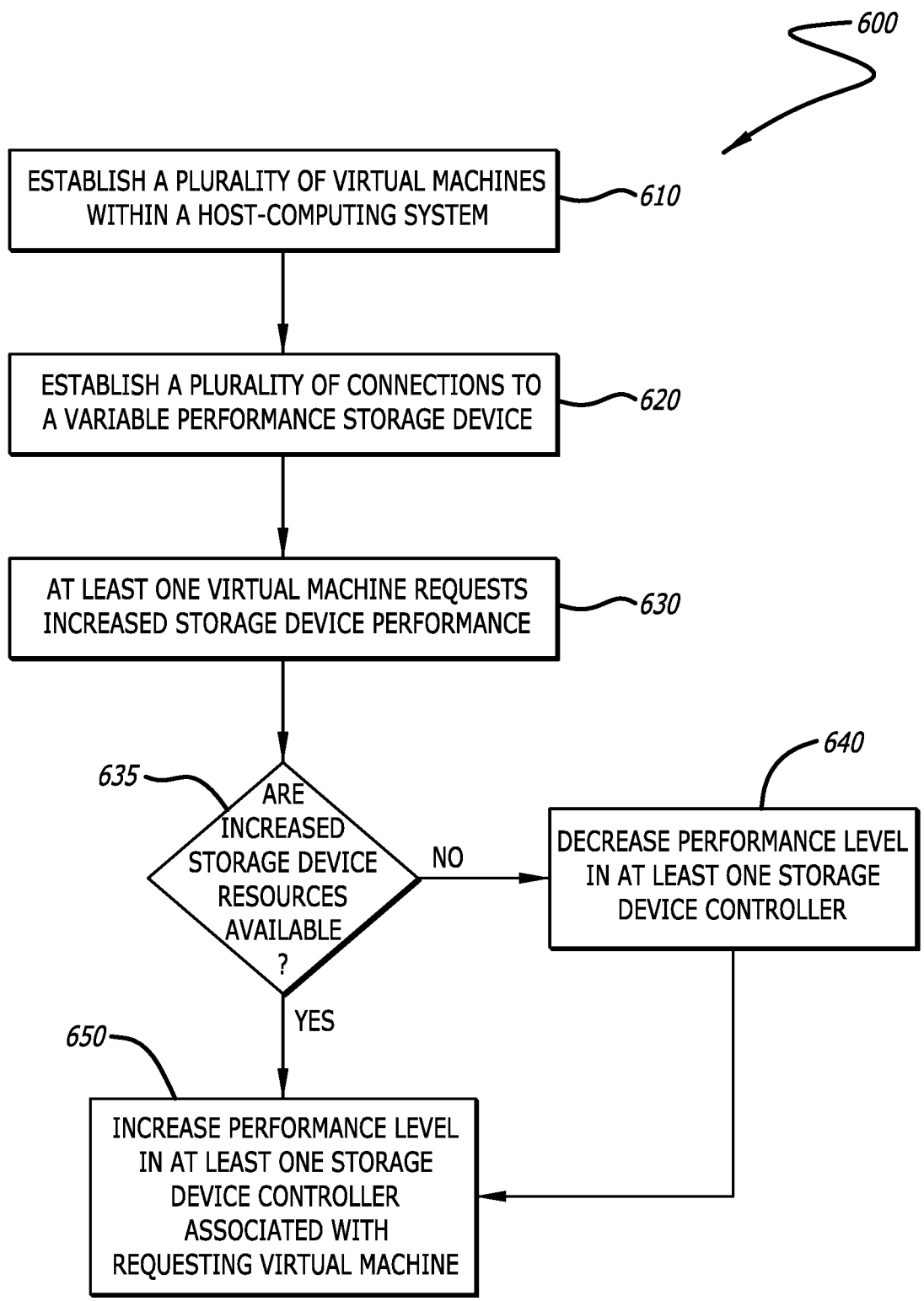
FIG. 6 is a flowchart depicting a process for requesting different performance levels within a variable performance storage device in accordance with embodiments of the invention.

Referring to FIG. 6, a flowchart depicting a process for requesting different performance levels within a variable performance storage device in accordance with embodiments of the invention is shown. The process 600 can start in response to a host-computing system establishing a plurality of virtual machines (block 610). As discussed above, the number of virtual machines utilized and/or instantiated is limited to the available computing power and/or resources. Each of these virtual machines can be configured to establish a connection to a variable performance storage device (block 620). In certain embodiments, this connection is facilitated by a hypervisor. In further embodiments, the plurality of connections is established through a specialized protocol interface that can bypass the hypervisor to reduce computational overhead.

In still further embodiments, each of the plurality of connections can be connected to the variable performance storage device 220 via a single (or dual in-band and side-band) communication channel which is then distributed or otherwise virtualized to other hardware or software-based controllers within the variable performance storage device 220. Either during operation or the set-up process, at least one of the virtual machines, hypervisor, or host-computing device will send a request for an increased or decreased performance level (block 630). Although FIG. 6 depicts a process 600 of requesting an increase in performance levels, it is contemplated that similar processes may encompass explicit requests for lowered performance levels in a similar manner to the process 600.

In response to the received request, the variable performance storage device 220 can determine if resources are available to facilitate the requested increase (block 635). If there are sufficient resources (or headroom) to honor the request, the process 600 can then increase the performance level of at least one controller within the variable performance storage device 220 associated with the virtual machine that was subject of the request (block 650). In the case of a request for decreased performance, there will always be enough resources available, however, there may be limits to the minimum performance control variable parameter settings available. When resources are not available for an increase, the process 600 can create headroom for the requested increase by decreasing the performance level in at least one other controller within the variable performance storage device 220 (block 640). This step can operate on various controller's performance control variables to create a more relative delineation between the "higher" performance levels and the "normal" or "lower" levels. Although performance levels may be requested, embodiments of the disclosed invention can also permit the host-computing device to alter each of the control performance variables based on desired applications. These embodiments are discussed below in FIGS. 7 and 8.

Figure 7:
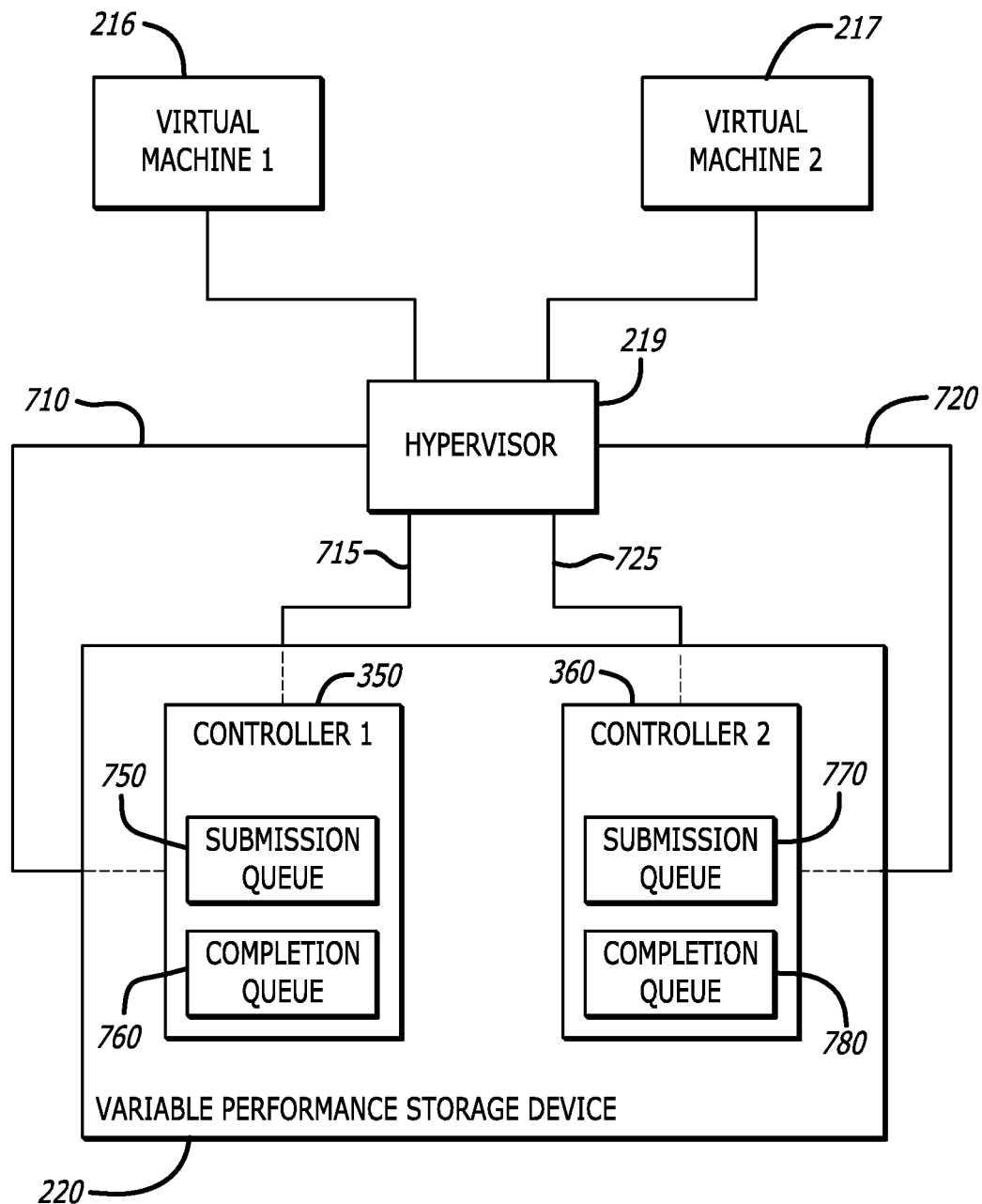
FIG. 7 is a conceptual block diagram of a variable performance storage device with multiple configurable performance controllers in communication with multiple virtual machines via in-band and side-band communication lines in accordance with an embodiment of the invention.

Referring to FIG. 7, a conceptual block diagram of a variable performance storage device with multiple configurable performance controllers in communication with multiple virtual machines via in-band and side-band communication lines in accordance with an embodiment of the invention is shown. As discussed above, a host-computing device may be configured to request a particular level of performance (or relative increase or decrease) from a plurality of preconfigured performance levels. However, additional embodiments of the invention provide methods for the host-computing device to request particular and precise changes to the performance control variables within each controller of the variable performance storage device 220. Each of these requests can directly alter the structure, operation, and/or processing of the submission and completion queues of each respective controller.

FIG. 7 depicts an example variable performance storage device 220 in communication with a hypervisor 219 that is facilitating connections to virtual machine 1 216 and virtual machine 2 217. In the specific embodiment depicted within FIG. 7, the hypervisor 219 comprises both an in-band communication line 715, 725 with controllers 1 and 2 350, 360 and a side-band communication line 710, 720. In many embodiments, the in-band communication lines 715, 725 are utilized for traditional input and output communication between the virtual machines 216, 217 and their virtual drives via respective controllers 350, 360. In these embodiments, sending requests and/or commands to alter performance control variables can be understood as reducing the potential bandwidth and/or speed of the variable performance storage device 220. In these cases, various embodiments can be configured to only communicate requests or commands to change performance control variables through a side-band communication line 710, 720, thus leaving the in-band communication lines 715, 725 to only handle standard input and output traffic.

Controller 1 350 is associated with at least one submission queue 750 and one completion queue 760. Likewise, controller 2 360 is associated with at least one submission queue 770 and one completion queue 780. Each of these queues 750, 760, 770, 780 can be altered, reassigned, or otherwise changed via a direct request or command from the host-computing device hosting virtual machine 1 216 and virtual machine 2 217. In some embodiments, the virtual machines 216, 217 themselves may make a request or command to alter performance. It is contemplated that any requests or commands to change or otherwise alter the performance levels of one or more controllers can be formatted to avoid requests from unauthorized users. This formatting may be directly related to a known security protocol or may obfuscate or otherwise scramble the request to avoid unauthorized commands from being processed. As described within the discussion of FIG. 5, changing performance control variables can directly impact a queue by increasing or decreasing the priority, number of queues, number of entries, command arbitration weight, and/or bandwidth limiter settings to name a few.

Figure 8:
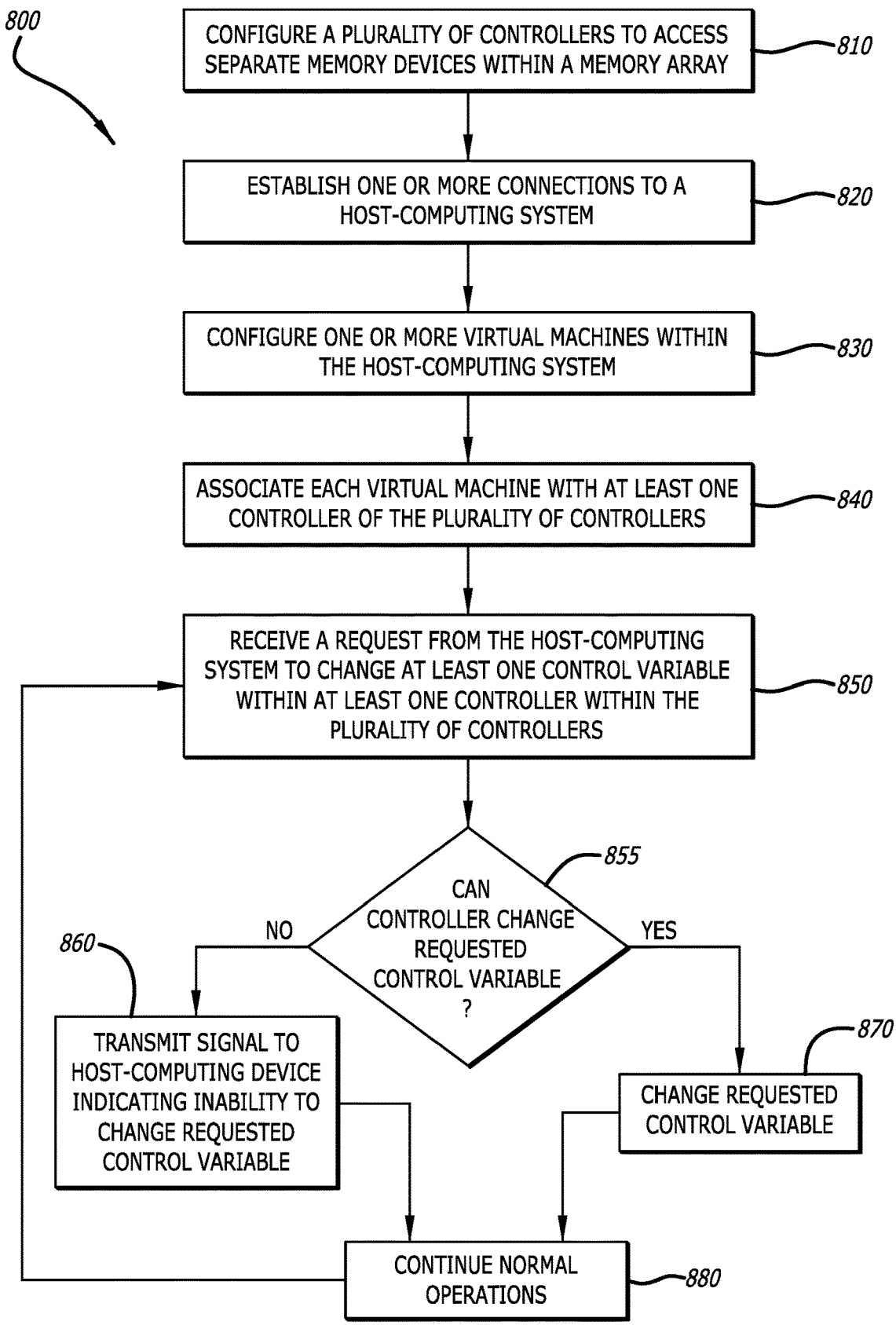
FIG. 8 is a flowchart depicting a process for receiving requests from a host-computing device to adjust specific performance control variables in accordance with an embodiment of the invention.

Referring to FIG. 8, a flowchart depicting a process 800 for receiving requests from a host-computing device to adjust specific performance control variables in accordance with an embodiment of the invention is shown. The process 800 can begin upon a plurality of controllers being configured to access separate memory devices within a memory array. As discussed above, the plurality of controllers within a variable performance storage device 220 can be physical or virtual and are only limited by available hardware or computing resources (block 810). Each controller can be configured to operate a particular section within the memory array. Although certain embodiments are discussed as being configured to access unique non-volatile memory devices within the array, it is contemplated that memory devices may be further split between various controllers as each device may have multiple memory address or memory cells that can be divided up between multiple controllers.

Connections from the plurality of controllers to a host-computing system can then be established (block 820). Virtual machines can be configured or instantiated within the host-computing system (block 830). Once configured, each virtual machine can be associated with at least one controller within the plurality of controllers (block 840). Although embodiments discussed with respect to FIG. 8 depict a particular order of connection, virtual machine establishment, etc., it is contemplated that this process 800 can be accomplished in a variety of temporal orders including, but not limited to, establishment of the virtual machines first, configuration of the communication connections to the variable performance storage device 220 next, and subsequent selection and configuration of the plurality of controllers last (in order to match the established connections, etc.).

During the course of operations (or in some embodiments, during set-up), the process 800 can receive a request from the host-computing system to change at least one performance control variable within at least one of the controllers within the plurality of controllers (block 850). As described in more detail in the discussion of FIG. 5, the performance control variables can be associated with particular values including, but not limited to, the priority number associated with a controller, or the number of queues or entries per queue. The requesting device can include the particular value that the performance control variable should be changed to within its request/command.

Upon receiving the request/command, the variable performance storage device 220 can determine if the specific controller can be changed to the requested value (block 855). If the controller can be changed to the requested value, the process 800 can change the requested variable (block 870). In response to a request or command not being able to be honored, the process 800 can transmit a signal to the host-computing device indicating the inability to change the requested variable (block 860). In one example, the host-computing device may request that the number of submission queues in a first controller be increased, but the native maximum number of submission queues within the variable performance storage device 220 have already been assigned to various controllers. In a number of embodiments, once the host-computing device receives the incompatibility or inability signal, it may re-configure the request and/or submit a precursor request to reduce one or more associated performance control variables in another controller in order to provide the resources (or headroom) to facilitate the original request. It is also contemplated that a host-computing device, in response to receiving a signal indicating that resources within the variable performance storage device 220 are currently exhausted, may transmit a subsequent signal configured to establish an additional communication connection with an additional storage device or computing system.

Once the requested performance control variable has been changed, or the signal indicating an inability to change the performance control variable is transmitted back to the host-computing device, the variable performance storage device 220 can continue normal operations (block 880). These normal operations can continue until a new request is received at a later time (block 850).

Figure 9:
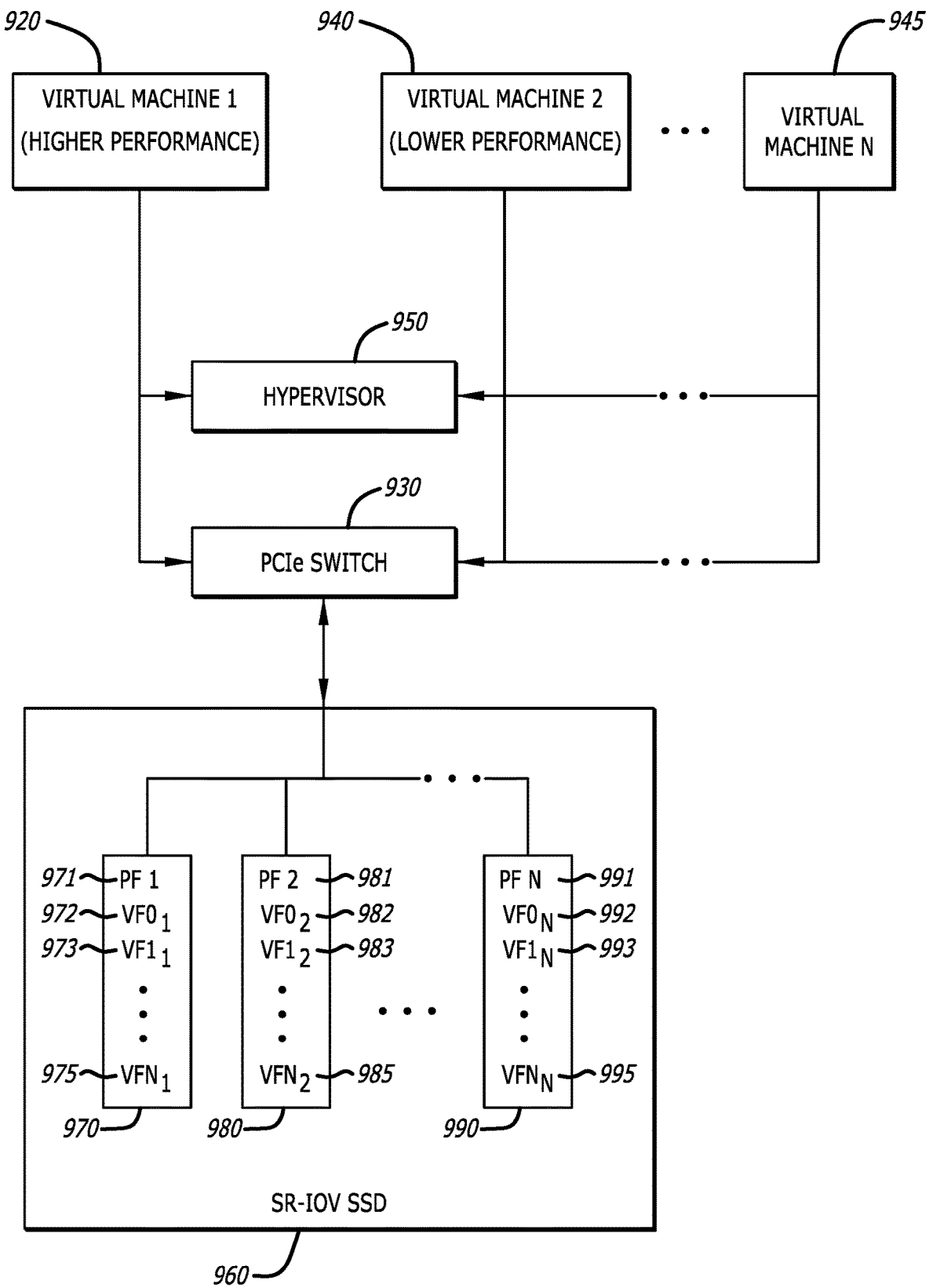
FIG. 9 is a conceptual block diagram depicting a single root input/output virtualization enabled variable performance storage device communicating with a plurality of virtual machines via virtualized configurable performance controllers in accordance with an embodiment of the invention.

Referring to FIG. 9, a conceptual block diagram depicting a single root input/output virtualization enabled variable performance storage device communicating with a plurality of virtual machines via virtualized configurable performance controllers in accordance with an embodiment of the invention is shown. Various conceptualized embodiments of the invention have been described above. FIG. 9 depicts a more specified embodiment that utilizes a specific set of standards and protocols including PCIe, NVMe, and single root input/output virtualization ("SR-IOV"). Specifically, the SR-IOV may be implemented within a solid-state drive ("SSD") 960. The SR-IOV SSD 960 can be communicatively coupled to a PCIe switch 930 which is itself communicatively coupled with a plurality of virtual machines 920, 940, 945. While the virtual machines 920, 940, 945 are in communication and managed by a hypervisor 950, the communication lines between the virtual machines 920, 940, 945 and the SR-IOV SSD 960 bypasses the hypervisor 950 and is handled by the PCIe switch 930. In this way, the hypervisor 950 has fewer demands related to data input and output on its available resources.

The controller within the SR-IOV SSD 960 may, in response to establishing connections with virtual machines 920, 940, 945 may generate virtual controllers which are configured to operate and "control" a particular portion of the memory array within the SR-IOV SSD 960. The SR-IOV SSD 960 can be configured for and/or communicate via the NVMe protocol. Within the SR-IOV SSD 960, a series of one or more physical functions ("PF") 971, 981, 991 are present which can correspond to a physical drive, portion of the memory array, or other physical partition. Each physical function 971, 981, 991 can have a plurality of virtual functions 972-975, 982-985, 992-995 that can act as virtualized controllers. Depending on the computing resources available, the virtual functions 972-975, 982-985, 992-995 can have a reduced set of commands available, meaning that they can only respond to a limited set of commands. These limited commands may be configured to be at least one or more vendor specific commands that provide access to request or command changes to specific performance mode levels or particular adjustments to any available performance control variable.

In many embodiments, each virtual function 972-975, 982-985, 992-995 can be assigned unique NVMe controller registers. In further embodiments, the virtual functions 972-975, 982-985, 992-995 will share the same PCIe configurations as their corresponding physical functions 971, 981, 991. By way of example and not illustration, virtual machine 1 920 is configured for high performance and may require a first PCIe configuration which is reflected within the first physical and virtual function set 970. Likewise, virtual machine 2 940 can be set to lower performance which includes a second PCIe configuration reflected in the physical and virtual function set 980. Finally, any other virtual machine n 945 can be assigned any particular PCIe configuration that is reflected within a corresponding physical and virtual function set 990.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A variable performance storage device comprising:
one or more communication channels suitable for connection with a host-computing device;
a plurality of memory devices within a memory array;
a plurality of controllers configured to provide access to separate memory devices within the memory array; and
performance logic configured to direct the plurality of controllers to operate at a plurality of performance modes, each associated with a different level of performance;
wherein each performance mode is selectable by a host-computing device and comprises one or more preconfigured control variables,
wherein once sufficient resources are not available to increase one level of performance, at least one other level of performance is decreased to free the required sufficient resources.

2. The variable performance storage device of claim 1, wherein the plurality of performance modes includes at least three performance modes; wherein a first performance mode provides more performance than a second mode and a third mode; the second performance mode provides less performance than the first performance mode, but more than the third performance mode; and the third performance mode provides less performance than the first and second performance modes.

3. The variable performance storage device of claim 1, wherein the one or more preconfigured control variables include a change in the priority of a submission queue associated with one of the plurality of controllers.

4. The variable performance storage device of claim 1, wherein the one or more preconfigured control variables include a change in the number of submission queues or completion queues associated with one of the plurality of controllers.

5. The variable performance storage device of claim 1, wherein the one or more preconfigured control variables include a change in the number of entries provided per submission queue or completion queue associated with one of the plurality of controllers.

6. The variable performance storage device of claim 1, wherein the host-computing device selects one of the plurality of performance modes via a request sent through a side-band communication channel within the one or more communication channels.

7. The variable performance storage device of claim 1, wherein the plurality of performance modes can be reconfigured via an update to a firmware deployed within the variable performance storage device.

8. A variable performance storage device comprising:
one or more communication channels suitable for connection with a host-computing device;
a plurality of memory devices within a memory array;
a plurality of controllers wherein at least two of the plurality of controllers provides access to separate memory devices within the memory array; and
performance logic configured to direct the plurality of at least two controllers to operate at various levels of performance based on one or more control variables;
wherein the one or more control variables are configured via requests received from a host-computing device,
wherein once sufficient resources are not available to increase one level of performance, at least one other level of performance is decreased to free the required sufficient resources.

9. The variable performance storage device of claim 8, wherein the one or more control variables configurable by the host-computing device include a change in the priority of a submission queue associated with one of the plurality of controllers.

10. The variable performance storage device of claim 8, wherein the one or more control variables configurable by the host-computing device include a change in the number of submission queues or completion queues associated with one of the plurality of controllers.

11. The variable performance storage device of claim 8, wherein the one or more control variables configurable by the host-computing device include a command arbitration setting associated with one of the plurality of controllers.

12. The variable performance storage device of claim 8, wherein the one or more control variables configurable by the host-computing device include the utilization of a submission queue bandwidth limiting function associated with one of the plurality of controllers.

13. The variable performance storage device of claim 8, wherein the one or more control variables are configurable via one or more vendor defined commands from the host-computing device.

14. The variable performance storage device of claim 8, wherein the one or more control variables configurable by the host-computing device includes formatting to restrict control variable changes to authorized users.

15. The variable performance storage device of claim 8, wherein one or more control variable configuration requests are received in response to one or more environmental inputs received by the host-computing device.

16. The variable performance storage device of claim 8, wherein one or more control variable configuration requests are received in response to one or more time-based inputs received by the host-computing device.

17. The variable performance storage device of claim 8, wherein at least one of the plurality of controllers are non-volatile memory express controllers.

18. The variable performance storage device of claim 8, wherein the storage device is configured to utilize single root input/output virtualization to communicate with the host-computing system.

19. The variable performance storage device of claim 8, wherein the storage device is further configured to, in response to receiving one or more control variable configuration request from a host-computing system that are incompatible with the current control variable configurations, sends a signal to the host-computing device indicating the incompatibility.

20. A method of configuring varying performance levels within a storage device, comprising:
    utilizing at least two of a plurality of controllers within the storage device to provide access to separate memory devices within a memory array of the storage device;
    establishing two or more communication channels with a host-computing device wherein each of the communication channels are configured to communicate with one of the at least two of the plurality of controllers;
    operating the storage device to provide the host-computing system unique access to the memory devices within the memory via one or more queues;
    receiving one or more requests from the host-computing device wherein the one or more requests are associated with changing at least one of a plurality of control variables; and
    adjusting, based on the received request, the at least one control variable associated with the request;
    wherein the at least one or more control variable is configured to change a configuration of at least one of the queues,
    wherein once sufficient resources are not available to increase one level of performance, at least one other level of performance is decreased to free the required sufficient resources.

* * * * *